US010514086B2

(12) United States Patent
Willis et al.

(10) Patent No.: US 10,514,086 B2
(45) Date of Patent: Dec. 24, 2019

(54) SYSTEM AND METHOD TO ALIGN BELT INTEGRATED STARTER GENERATOR TENSIONERS

(71) Applicant: Ford Global Technologies, LLC, Dearborn, MI (US)

(72) Inventors: Scott Willis, Gibralter, MI (US); Joseph A Skrobowski, New Boston, MI (US); James Basile, Dundee, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/890,572

(22) Filed: Feb. 7, 2018

(65) Prior Publication Data
US 2019/0242462 A1 Aug. 8, 2019

(51) Int. Cl.
*F16H 7/12* (2006.01)
*B23Q 17/22* (2006.01)
*F16H 7/08* (2006.01)

(52) U.S. Cl.
CPC .............. *F16H 7/12* (2013.01); *B23Q 17/22* (2013.01); *B23Q 2717/00* (2013.01); *F16H 2007/0842* (2013.01); *F16H 2007/0865* (2013.01); *F16H 2007/0874* (2013.01); *F16H 2007/0893* (2013.01)

(58) Field of Classification Search
CPC ............... F16H 7/12; F16H 2007/0842; F16H 2007/0865; F16H 2007/0874; F16H 2007/0893; B23Q 17/22; B23Q 2717/00
See application file for complete search history.

(56) References Cited

U.S. PATENT DOCUMENTS

| 5,176,580 A * | 1/1993 | Stamm | F16F 9/306 474/101 |
|---|---|---|---|
| 9,528,826 B2 | 12/2016 | Garvey | |
| 2003/0153420 A1* | 8/2003 | Rogers | F16H 7/12 474/134 |
| 2010/0076634 A1* | 3/2010 | Brigham | B60K 6/485 701/22 |
| 2015/0167797 A1* | 6/2015 | Noguchi | F16H 7/1281 477/3 |

(Continued)

OTHER PUBLICATIONS http://www.toolingandproduction.com/qim/1004on-machine.aspx.
http://www.steptools.com/stepnc/2008_sweden/closedloop.

*Primary Examiner* — Christopher M Koehler
(74) *Attorney, Agent, or Firm* — Diana Brehob, Brehob Law, PLLC; Gregory P. Brown; Geoffrey G. Brumbaugh

(57) ABSTRACT

Some belt-driven integrated-starter generators (BISGs) have twin-arm tensioners mounted directly to the BISG. Because the distance between the tensioner and the BISG pulley is quite short, any stack up tolerance leads to relatively high misalignment, which, in turn, leads to belt wear and noise. To minimize misalignment, a process is disclosed to machine the tensioner pulley bearing seats on the tensioner arms after assembly to the BISG. The BISG pulley is rotated with three probes recording the axial position change of the BISG pulley over a complete revolution. These data are used to establish a best-fit plane and the tensioner pulley bearing seats are machined to match the best-fit plane so that during operation belt twisting and shifting are minimized.

18 Claims, 5 Drawing Sheets

(56) References Cited

U.S. PATENT DOCUMENTS

| | | | |
|---|---|---|---|
| 2015/0260264 A1* | 9/2015 | Petridis | F16H 7/08 |
| | | | 474/110 |
| 2017/0267242 A1* | 9/2017 | Khafagy | B60W 10/06 |
| 2018/0298995 A1* | 10/2018 | Reuschel | F02B 67/06 |
| 2018/0355954 A1* | 12/2018 | Kim | F16H 7/12 |
| 2018/0355955 A1* | 12/2018 | Lee | B60W 20/00 |
| 2019/0017579 A1* | 1/2019 | Stadermann | F16H 7/12 |

* cited by examiner

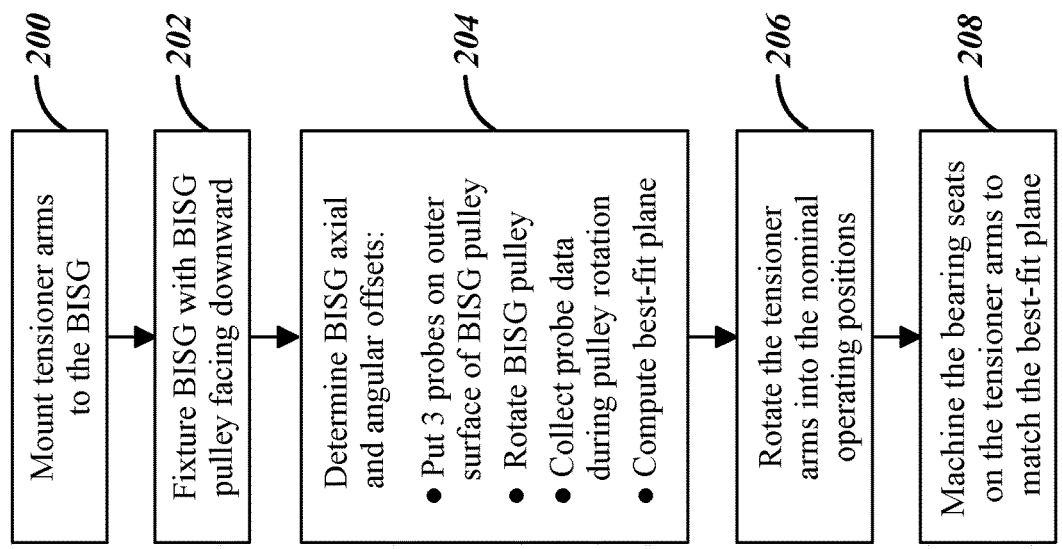
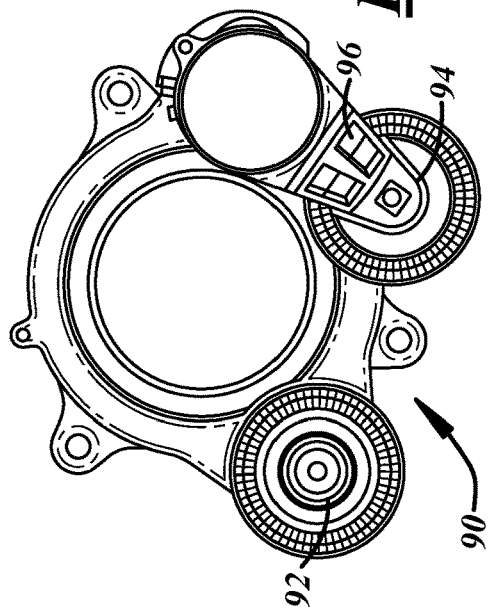
FIG. 5
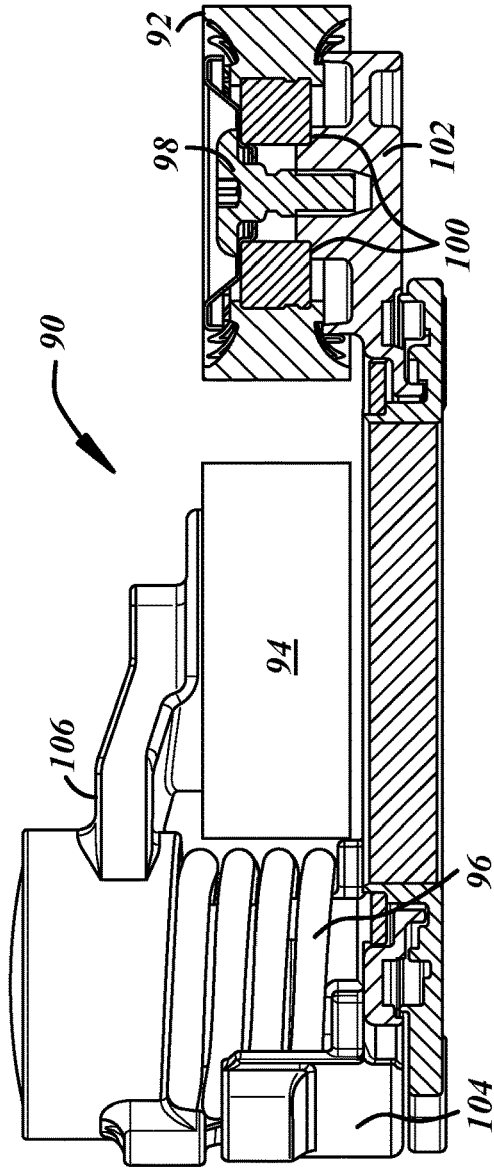
FIG. 6
FIG. 7

SYSTEM AND METHOD TO ALIGN BELT INTEGRATED STARTER GENERATOR TENSIONERS

FIELD

The present disclosure relates to systems and methods to align a belt integrated starter generator (BISG) tensioner.

BACKGROUND

Automotive vehicles commonly employ an alternator, which is driven from the crankshaft to produce electrical energy for storage in the battery to power onboard accessories such as the electronic control module, power windows, fans, etc., and a starter motor that engages with a ring gear on the flywheel to rotate the engine for starting. Some more recent vehicles use an integrated starter-generator (ISG), a single rotating electrical module in place of two. Additionally, an ISG facilitates mild hybridization.

ISGs can be coupled to the engine via a gear. Alternatively, the ISG can be a belt driven ISG (BISG). To prevent belt slippage in both the driven (electrical generation) mode and the driving (engine starting) modes, tensioners are provided against the entry span and exit span of the belt. Mounting the tensioners close to the BISG results in short belt spans between the tensioner pulley and the BISG pulley, i.e., more compactness. However, the inevitable stack up tolerances, when taken over a short span length between the pulley of the BISG and the tensioner, lead to a large belt misalignment angle and/or offset. Such a condition results in belt wear and ultimately belt noise. The particular frequency of a whining or chirping belt is particularly annoying to vehicle occupants and can lead to significant customer dissatisfaction. A way to improve the alignment of the belt tensioner pulleys with respect to the BISG pulley is desired.

SUMMARY

To overcome the misalignment problem that leads to belt issues, an alignment method is disclosed that includes: mounting a tensioner having at least one tensioner arm onto a belt integrated-starter generator (BISG), measuring offset of a pulley of the BISG, and machining bearing seats on the tensioner arms based on the measured offset of the BISG pulley.

The measured offset is determined relative to datums on the BISG. The datums on the BISG are attachment features. The measured offset comprises at least one of axial misalignment and angular misalignment.

The BISG is mounted into a fixture prior to measuring the offset.

Measuring offset of the BISG pulley may further include: placing at least three spaced-apart probes against a circumferential surface of the BISG pulley adapted for a belt to ride against, rotating the BISG pulley, collecting probe data as a function of rotational angle, analyzing the data to determine axial misalignment and angular misalignment of the BISG pulley, and determining a best-fit plane of the BISG pulley.

The circumferential surface of the BISG pulley has a plurality of circumferential grooves. Ends of the probes are hemispherical. The ends of the probes ride in one of the circumferential grooves during the rotation of the BISG pulley for collecting probe data.

The bearing seats of the tensioner arms are machined to match the best-fit plane of the BISG pulley.

The tensioner arms are rotated into a nominal operating position prior to machining the bearing seats.

The two tensioner arms are integrated into a twin-arm tensioner.

Also disclosed in an alignment method that includes: mounting a tensioner on a rotating electrical module (REM), the tensioner having at least one tensioner arm with a bearing seat, mounting the REM onto a measuring fixture, measuring axial and angular offset of a pulley of the REM and machining the bearing seat of the tensioner arm based on the measured offsets of the pulley of the REM.

The measured offsets are determined relative to a plurality of datums on the REM. The datums on the REM are proximate attachment features of the REM. At least one of the attachment features is a bolt hole. One or more of the datums, in some embodiments, is a boss with a bolt hole therein.

The method may also include: placing at least three spaced-apart probes against a circumferential surface of the REM pulley adapted for a belt to ride against, rotating the REM pulley, collecting probe data as a function of rotational angle, analyzing the data to determine axial misalignment and angular misalignment of the REM pulley, and determining a best-fit plane of the REM pulley.

Measuring offset of the REM pulley, in some embodiments includes: placing at least three spaced-apart probes against a circumferential surface of the REM pulley adapted for a belt to ride against, rotating the REM pulley, collecting probe data as a function of rotational angle, analyzing the data to determine axial misalignment and angular misalignment of the REM pulley, and determining a best-fit plane of the REM pulley.

The circumferential surface of the REM pulley has a plurality of circumferential grooves. Ends of the probes are hemispherical. Ends of the probes ride in one of the circumferential grooves during the rotating of the REM pulley for collecting probe data.

The REM is a BISG, in some embodiments. The at least one tensioner arm comprises an entry tensioner arm and an exit tensioner arm. The bearing seats of the entry and exit tensioner arms are machined to match the best-fit plane of the BISG pulley.

The tensioner arms are spring loaded to provide tension on the belt during operation. The tensioner arms are rotated into a nominal position prior to machining the bearing seats.

Also disclosed is a method to align bearing seats of a twin-arm tensioner coupled to a belt integrated-starter generator (BISG), including: measuring axial and angular offsets of a pulley of the BISG with respect to predetermined datums on the BISG, determining a best-fit plane of the BISG pulley based on the offsets, and machining bearing seats on the tensioner arms to match the best-fit plane of the BISG pulley.

The datums are attachment points of the BISG, such as a boss proximate a bolt hole.

The method can include: fixturing the BISG prior to measuring the offsets and orienting the BISG; the fixture so that machining chips from the bearing seats fall away from the BISG; placing at least three spaced-apart probes against a circumferential surface of the BISG pulley adapted for a belt to ride against; rotating the BISG pulley; collecting probe data as a function of rotational angle; computing the axial misalignment and angular offsets of the BISG pulley based on the probe data; and determining the best-fit plane of the BISG pulley based on the axial and angular misalignments.

The two tensioner arms are integrated into a two-arm component. The tensioner includes a spring that acts on the tensioner arms.

BRIEF DESCRIPTION OF THE DRAWINGS

FIG. 5 shows a twin-arm tensioner;

FIG. 6 is the tensioner of FIG. 5 partially in cutaway to show the bearing seats on which the tensioner pulleys ride; and FIG. 7 is a flowchart of steps involved in aligning the BISG and tensioner.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
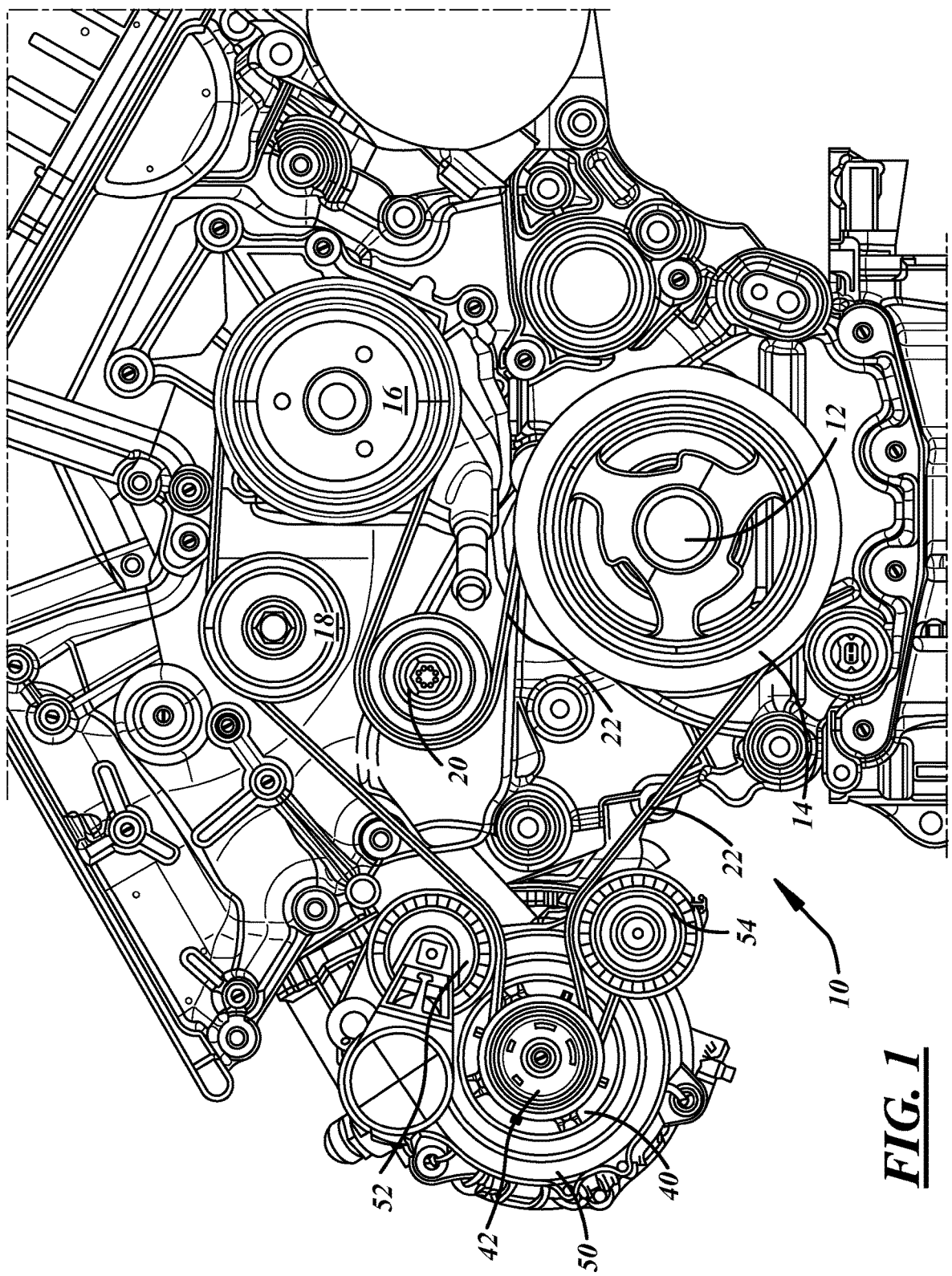
FIG. 1 is an illustration of a front end of an internal-combustion engine to which a BISG is coupled.

A front view of an engine 10, in FIG. 1, shows a front-end accessory drive. An end of a crankshaft 10 has a crankshaft pulley 12 coupled thereto. The accessories that are driven by or driving crankshaft 12 are a water pump, and a belt integrated starter generator (BISG) 40. A serpentine belt 22 couples the pulleys in the system: a water pump pulley 16, idler pulleys 18 and 20, crankshaft pulley 14, and a BISG pulley 42. A tensioner 50 is coupled to BISG 40. Tensioner 50 has two pulleys 52 and 54. Because BISG is driven during electrical generation and is driving during engine starting, to ensure the proper tension, a spring-loaded pulley is provided on both the entry side (i.e., the side where the belt is traveling to crankshaft pulley 14) and the exit side (i.e., the side where the belt is exiting BISG pulley 42 and traveling to idler pulley 18).

Figure 2:
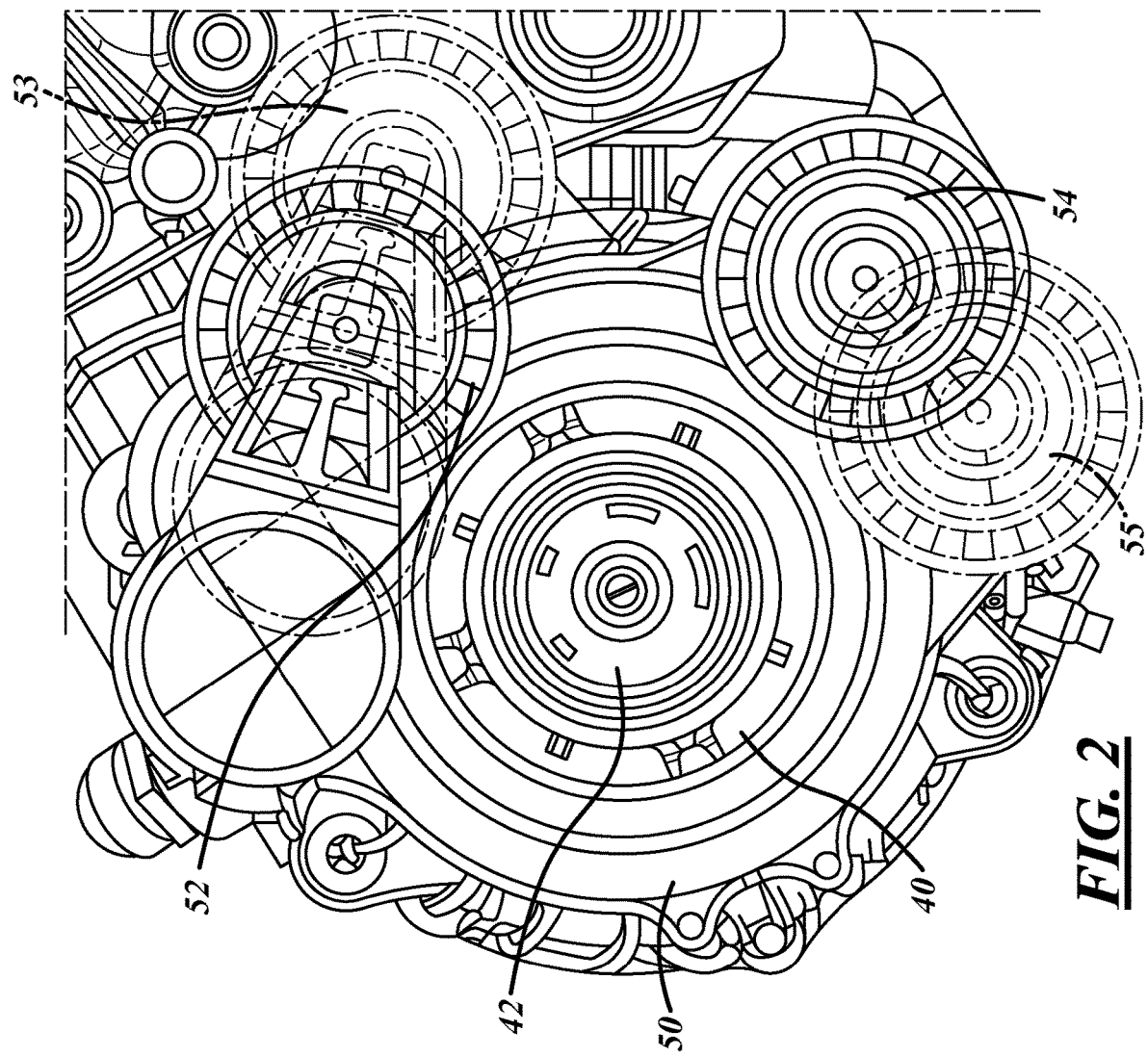
FIG. 2 is a portion of FIG. 1 showing the ends of travel of the tensioner pulleys.

Tensioner pulleys 52 and 54 are provided on short arms (not separately visible in FIG. 1), the arms rotating over a small number of angles. In FIG. 2, the range of motion of the tensioner pulleys is illustrate with 52 showing one end of travel and 53 showing the other end of travel for pulley 52. Similarly, 55 shows the other end of travel for pulley 54. The pulleys move, in operation, based on the applied forces on them from belt 22 and the spring that acts upon them.

Figure 3:
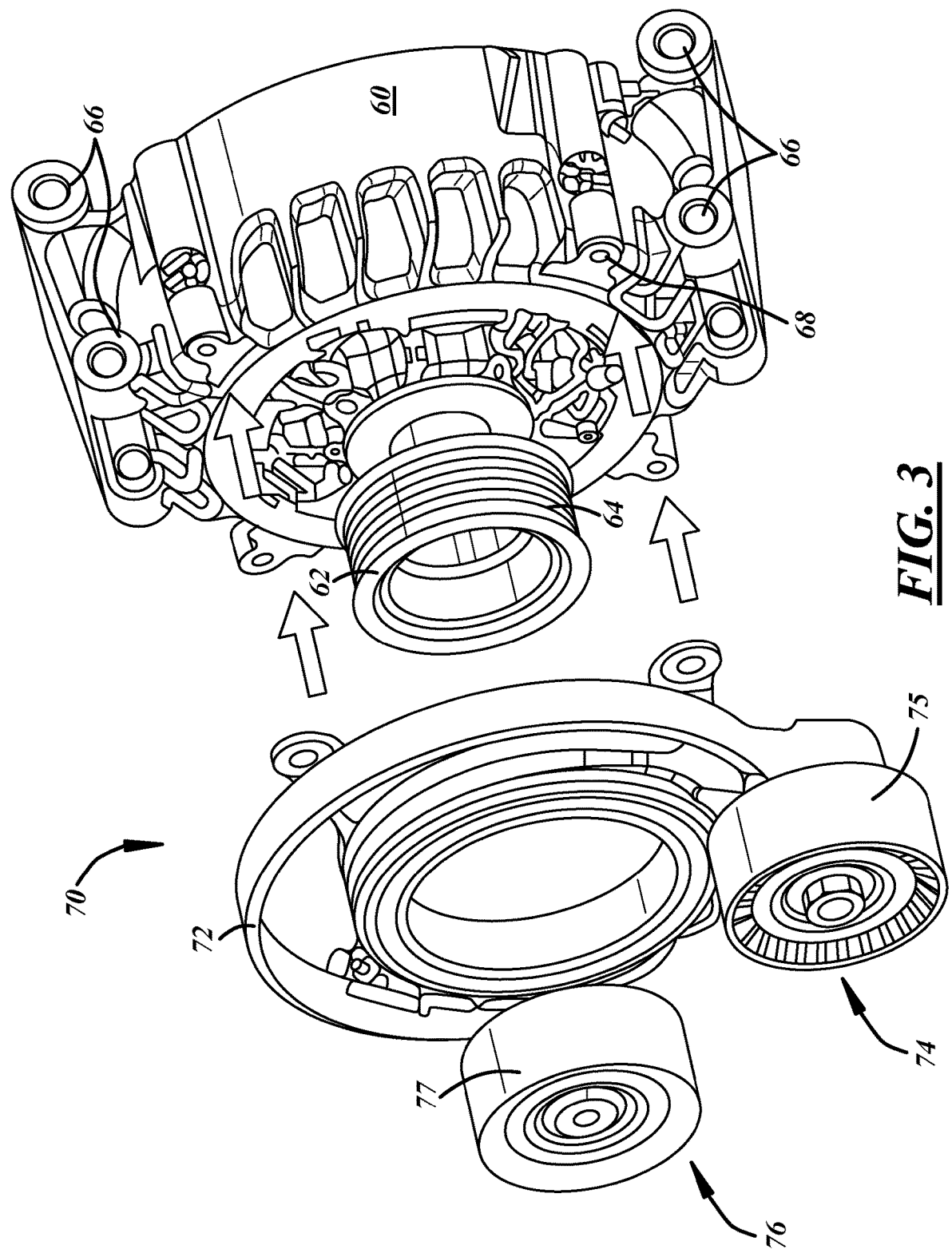
FIG. 3 is an isometric view of a BISG and a tensioner which couples to the BISG.

In FIG. 3, a BISG 60 is shown with a tensioner 70 prior to installation. BISG 60 has a pulley 62 with circumferential grooves 64. It is at this outer circumference of pulley 62, i.e., the surface with the grooves where the belt (not shown) rides in operation. For alignment of the system, datums are used for measurement. On BISG 60, four datums 66 are used that are bosses of attachment feature. The attachment features next to datums 66 are coupled to brackets that couple to the engine. Bolt holes 68 are provided to couple a tensioner 70 to BISG 60.

Tensioner 70 has a flat spring 72 that couples to pulleys 74 and 76. During operation the belt rides on outer surfaces 75 and 77 of pulleys 74 and 76, respectively.

Figure 4:
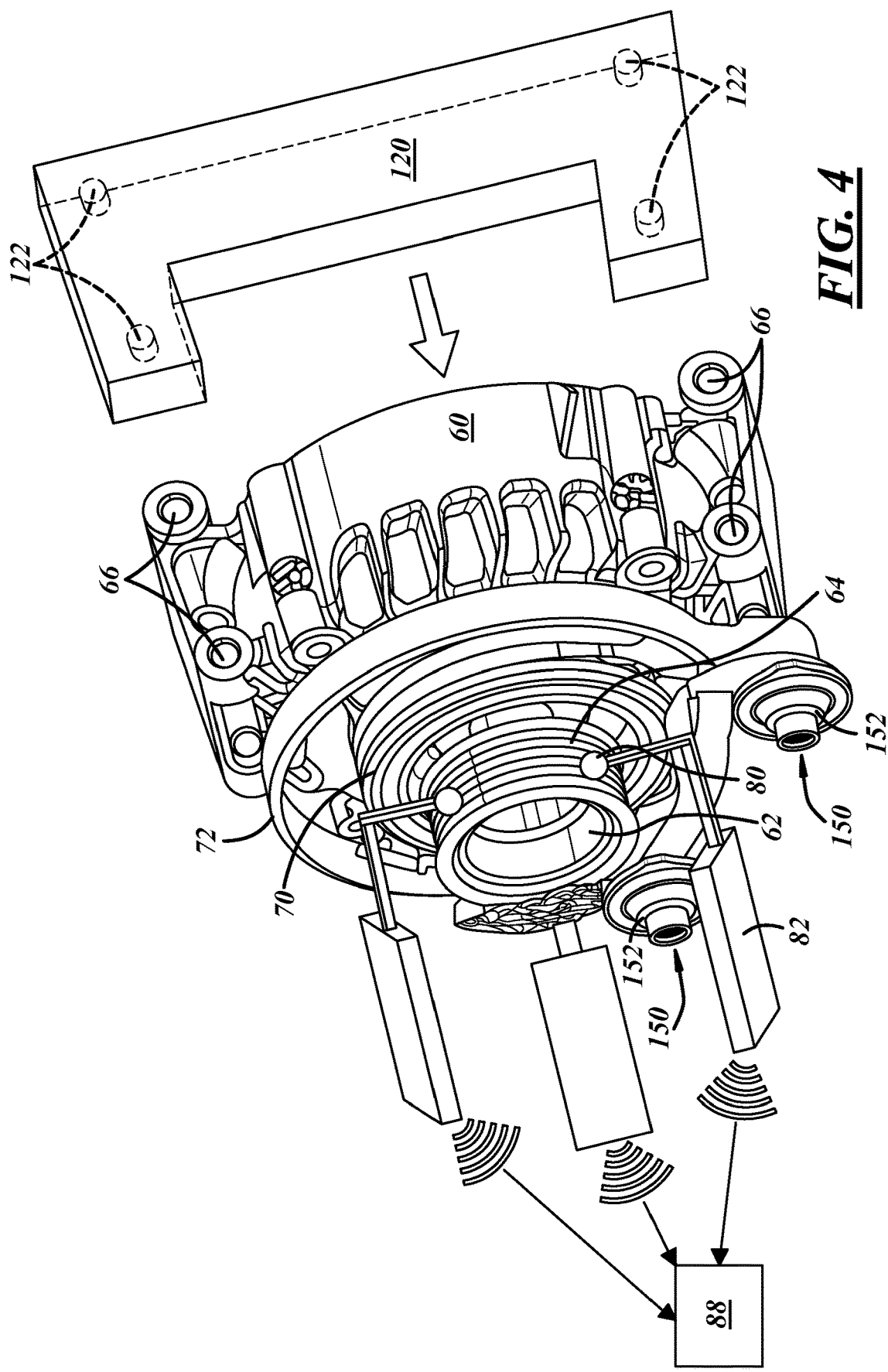
FIG. 4 shows the BISG of FIG. 3 assembled to the tensioner with measuring sensors arranged on the BISG pulley.

A portion of a measurement system is shown in FIG. 4. Tips of probes 80 ride in a groove 64 of BISG pulley 62. Three equally-spaced probes are shown in FIG. 4. In other embodiments, more probes can be used and/or a different spacing of the probes can be used. Probes 80 are coupled to sensors 82, which provide electrical signals to data collection device 88. Wireless signals are shown in FIG. 4. Alternatively, data collection device is coupled to sensors 82 via electrical wires. A static measurement of the position of probes 80 with respect to datums 66 provide some of the alignment information. However, problems with the shaft are uncovered by rotating pulley 62 and measuring the position of probes 80 as a function of rotation angle.

Tensioner 70 has two pulleys 150 are partially disassembled as shown in FIG. 4 so that bearing seats 152 of pulleys 150 are visible and accessible for machining based on the analyzed data from sensors 82.

Also shown in FIG. 4 is a fixture 120 that has nubs 122 that engage with the bolt holes proximate datums 66 on the bosses. Fixturing BISG 60 involves at least engaging nubs 122 with the bolt holes associated with datums 66.

An alternative tensioner 90 is shown in FIG. 5 that has pulleys 92 and 94. A tensioner arm 96 of pulley 94 is visible in FIG. 5. FIG. 6 illustrates a side view of tensioner 90 that is partially sectioned. A coil spring 96 provides the desired tension for both pulleys 92 and 94. Pulley 4 is shown in cross section to show a bolt 98 that couples pulley 92 to a tensioner arm 102. It is a surface of bearing seats 100 that control the alignment of pulley 92. Bearing seats 100 are machined based on data collected on alignment. In some embodiments, the tensioner pulleys are coupled to the BISG via a single tensioner arm, such as 102. For pulley 94, the tensioner arm is made up of two pieces 104 and 106.

A BISG is just one example rotating electrical module (REM) to which the present disclosure applies. A BISG typically has a tensioner with an entry and an exit pulley. In the embodiments shown herein, the pulleys are coupled to a two-arm tensioner that couples directly to the BISG. In alternative configurations, one or both of the pulleys that apply tension are coupled to other engine components, in which case misalignment has a less magnified effect on belt twisting and offset because the pulley is often displaced from the BISG pulley by a great distance. The present disclosure applies to any REM, such as an alternator, and to situations with one or two spring-loaded pulleys to provide tension.

In FIG. 7, an alignment process is shown in which the tensioner is mounted to the BISG in block 200. Then the BISG is fixtured in block 202. It can be useful to orient the BISG pulley downwards so that when the machining commences on the bearing surfaces onto which the tensioner arm pulleys sit, the chips fall downward. In block 204, the axial and angular offset of the BISG pulley are determined by putting three (or more) angularly-spaced probes on an outer surface of the BISG pulley. The probe ends might be hemispherical or pointed. The probe ends engage in one of the grooves on the outer circumference of the BISG pulley, i.e., where the belt rides during operation. The BISG pulley is next rotated while sensor coupled to the probes provide signals to a data acquisition unit. Data are collected as a function of angular position of the BISG pulley. From these data, a best-fit plane is computed. The offsets are computed based on datums on the BISG. In block 206, the tensioner arms are rotated to be in the nominal operation position. In FIG. 2, the extreme positions that the tensioner arms can attain are shown. In normal operation, there is a nominal position that the tensioner attains that is between these two extremes. Prior to machining, the tensioner arms are rotated into their nominal positions. In block 208, the bearing seats on the tensioner arms are machined to lie in the best-fit plane that was determined in block 204.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, recyclability, environmental factors, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An alignment method, comprising:
   mounting a tensioner on a rotating electrical module (REM), the tensioner having at least one tensioner arm with a bearing seat;
   mounting the REM onto a measuring fixture;
   measuring axial and angular offset of a pulley of the REM; and
   machining the bearing seat of the tensioner arm based on the measured offsets of the pulley of the REM.

2. The method of claim 1 wherein:
   the measured offsets are determined relative to a plurality of datums on the REM;
   the datums on the REM are proximate attachment features of the REM; and
   at least one of the attachment features is a bolt hole.

3. The method of claim 1, further comprising:
   placing at least three spaced-apart probes against a circumferential surface of the REM pulley adapted for a belt to ride against;
   rotating the REM pulley;
   collecting probe data as a function of rotational angle;
   analyzing the data to determine axial misalignment and angular misalignment of the REM pulley; and
   determining a best-fit plane of the REM pulley.

4. The method of claim 1 wherein measuring offset of the REM pulley comprises:
   placing at least three spaced-apart probes against a circumferential surface of the REM pulley adapted for a belt to ride against;
   rotating the REM pulley;
   collecting probe data as a function of rotational angle;
   analyzing the data to determine axial misalignment and angular misalignment of the REM pulley; and
   determining a best-fit plane of the REM pulley.

5. The method of claim 4 wherein:
   the circumferential surface of the REM pulley has a plurality of circumferential grooves;
   ends of the probes are hemispherical; and
   the ends of the probes ride in one of the circumferential grooves during the rotating of the REM pulley for collecting probe data.

6. The method of claim 5 wherein:
   the REM is a belt integrated starter generator (BISG);
   the at least one tensioner arm comprises an entry tensioner arm and an exit tensioner arm; and
   the bearing seats of the entry and exit tensioner arms are machined to match the best-fit plane of the BISG pulley.

7. The method of claim 6 wherein:
   the tensioner arms are spring loaded to provide tension on the belt during operation; and
   the tensioner arms are rotated into a nominal operating position prior to machining the bearing seats.

8. The alignment method of claim 1 wherein the REM is a belt integrated-starter generator (BISG).

9. The method of claim 1 wherein:
   the at least one tensioner arm comprises an entry tensioner arm and an exit tensioner arm; and
   the bearing seats of the entry and exit tensioner arms are machined to match the best-fit plane of the pulley.

10. The method of claim 9 wherein:
    the tensioner arms are spring loaded to provide tension on the belt during operation; and
    the tensioner arms are rotated into a nominal operating position prior to machining the bearing seats.

11. The method of claim 9 wherein:
    the two tensioner arms are integrated into a two-arm component; and
    the tensioner includes a spring that acts on the tensioner arms.

12. The method of claim 1, further comprising: orienting the REM and the measuring fixture so that machining chips from the bearing seat fall away from the REM.

13. An alignment method, comprising:
    mounting a tensioner having at least one tensioner arm onto a rotating electrical module (REM);
    measuring offset of a pulley of the REM; and
    machining bearing seats on the at least one tensioner arm based on the measured offset of the REM pulley.

14. The method of claim 13 wherein:
    the measured offset is determined relative to datums on the REM;
    the datums on the REM are attachment features; and
    the measured offset comprises at least one of axial misalignment and angular misalignment.

15. The method of claim 13, further comprising: fixturing the REM prior to measuring the offset.

16. The method of claim 13 wherein measuring offset of the REM pulley comprises:
    placing at least three spaced-apart probes against a circumferential surface of the REM pulley adapted for a belt to ride against;
    rotating the REM pulley;
    collecting probe data as a function of rotational angle;
    analyzing the data to determine axial misalignment and angular misalignment of the REM pulley; and
    determining a best-fit plane of the REM pulley.

17. The alignment method of claim 13 wherein the REM is a belt integrated-starter generator (BISG).

18. The method of claim 17 wherein:
    the at least one tensioner arm comprises an entry tensioner arm and an exit tensioner arm; and the bearing seats of the entry and exit tensioner arms are machined to match the best-fit plane of the pulley.

* * * * *